US008135440B2

(12) United States Patent
Hong et al.

(10) Patent No.: US 8,135,440 B2
(45) Date of Patent: Mar. 13, 2012

(54) SYSTEM FOR USING MOBILE COMMUNICATION TERMINAL AS POINTER AND METHOD AND MEDIUM THEREOF

(75) Inventors: Young-jin Hong, Yongin-si (KR); Sang-goog Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1198 days.

(21) Appl. No.: 11/709,224

(22) Filed: Feb. 22, 2007

(65) Prior Publication Data

US 2007/0243863 A1 Oct. 18, 2007

(30) Foreign Application Priority Data

Apr. 17, 2006 (KR) .................. 10-2006-0034589

(51) Int. Cl.
*H04B 1/38* (2006.01)
(52) U.S. Cl. .................. 455/566; 455/569.1; 455/575.2; 455/556.1; 455/557
(58) Field of Classification Search .................. 455/566, 455/569.1, 575.2, 556.1, 557
See application file for complete search history.

(56) References Cited

U.S. PATENT DOCUMENTS

| 6,046,712 | A | * | 4/2000 | Beller et al. | 345/8 |
| 6,124,843 | A | * | 9/2000 | Kodama | 715/856 |
| 7,917,847 | B2 | * | 3/2011 | Uematsu et al. | 715/236 |
| 2004/0125073 | A1 | * | 7/2004 | Potter et al. | 345/156 |
| 2005/0213593 | A1 | * | 9/2005 | Anderson et al. | 370/419 |
| 2007/0069976 | A1 | * | 3/2007 | Willins et al. | 345/8 |
| 2007/0237491 | A1 | * | 10/2007 | Kraft | 386/46 |

FOREIGN PATENT DOCUMENTS

| JP | 2005-069759 | 3/2005 |
| JP | 2005-184433 | 7/2005 |
| KR | 10-2004-0096880 | 11/2004 |
| KR | 10-2005-0102723 | 10/2005 |
| KR | 10-2005-0108123 | 11/2005 |
| KR | 10-2006-0026273 | 3/2006 |

OTHER PUBLICATIONS

Notice of Allowance dated May 28, 2007 issued in corresponding Korean Patent Application No. 10-2006-0034589.

* cited by examiner

*Primary Examiner* — Nghi Ly
(74) *Attorney, Agent, or Firm* — Staas & Halsey LLP

(57) ABSTRACT

A system for using a mobile communication terminal as a pointer and a method and medium thereof are disclosed, in which information displayed on a head mounted display (HMD) can be controlled by using the mobile communication terminal as the pointer. The system includes a head mounted display device receiving an input of an image of a background having a marker, and the mobile communication terminal searching for the position of the marker by detecting the marker from the image of the background having the marker transmitted from the head mounted display device, and providing the pointer to the searched position. The head mounted display device displays the pointer provided by the mobile communication terminal.

26 Claims, 9 Drawing Sheets

SYSTEM FOR USING MOBILE COMMUNICATION TERMINAL AS POINTER AND METHOD AND MEDIUM THEREOF

CROSS-REFERENCE TO RELATED APPLICATIONS

This application is based on and claims the benefit of Korean Patent Application No. 10-2006-0034589, filed on Apr. 17, 2006, in the Korean Intellectual Property Office, the disclosure of which is incorporated herein in its entirety by reference.

BACKGROUND OF THE INVENTION

1. Field of the Invention

The present invention relates to a system for using a mobile communication terminal (device) as a pointer and a method thereof, and more particularly, to a system for using a mobile communication terminal (device) as a pointer and a method and medium thereof that can control information displayed on a head mounted display (HMD) by making it possible to use the mobile communication terminal (device) as the pointer.

2. Description of the Related Art

With the development of integration technology, diverse portable appliances have appeared. Starting from audio players, such as tape players and CD players, and pagers, portable phones and MP3 players have been widely spread, and portable game machines have currently appeared.

Particularly, the portable phone has diverse features in addition to communication features, and representative diverse features include a digital camera and an MP3 player.

Virtual reality is one of new paradigms in the field of intelligence activities, which enables a human being to indirectly experience situations that the user cannot experience in the real world due to spatial and physical limitations, through an interaction with the human sensory system in a virtual environment constructed using a computer. A final target of the virtual reality is to provide environments in which a human being can communicate with a computer more realistically by heightening the dialogic capability between the computer and the human being through the use of diverse input/output units. As the input/output units between the computer and the human being, devices, such as a head mounted display (HMD), data glove, and motion capture, may be used. The HMD is a display device that a user wears on the head to transmit position change data according to the motion of the user's head to a computer so that the computer calculates the size and depth of an object to appear in the user's sight.

However, if it is intended to use information provided on an HMD screen, the position of a mouse pointer should be detected. In this case, the user needs a device serving as a mouse pointer that transmits a separate signal to the HMD. Accordingly, in an HMD environment, a sensor for detection of a pointer position and additional hardware and software for the corresponding signal process are required.

Korean Patent Unexamined Publication No. 2004-0096880, entitled "Large-screen graphical user interface (GUI) control apparatus using motion sensing of a portable information device", discloses a GUI control method using a portable information device in a PC environment, which can make it possible to use the portable information device as a GUI mouse pointer of the PC. According to this method, the portable device is manipulated in a similar manner to the mouse of the PC so as to provide a PC scene on the screen of the portable device. However, this method requires a separate motion sensor mounted on the portable device, and this causes the manufacturing cost of the portable device to be increased. In addition, this prior art fails to describe a technique for moving the portable device in a three-dimensional direction.

SUMMARY OF THE INVENTION

Accordingly, the present invention has been made to solve the above-mentioned problems occurring in the prior art, and an aspect of the present invention is to make it possible to use a mobile communication terminal as a pointer when a head mounted display (HMD) is used, which can perform a position detection without installing any separate motion monitoring sensor in the mobile communication terminal, and to provide a pointer to a detected position so as to control information displayed on an HMD screen.

Another aspect of the present invention is to control information three-dimensionally arranged on an HMD screen by making it possible to use a mobile communication terminal as a pointer.

In an aspect of the present invention, there is provided a mobile communication terminal, which includes a control unit outputting a marker of a specified form on a screen, a first communication unit receiving an image of a background that includes the marker from a head mounted display, and a position detection unit searching for the position of the marker by detecting the marker from the received image.

In another aspect of the present invention, there is provided a head mounted display device, which includes an image input unit receiving an input of an image of a background that includes a marker, a second communication unit transmitting the image of the background that includes the marker to a mobile communication terminal, and a second display unit displaying a pointer provided by the mobile communication terminal.

In still another aspect of the present invention, there is provided a system for using a mobile communication terminal as a pointer, which includes a head mounted display device receiving an input of an image of a background that includes a marker, and the mobile communication terminal searching for the position of the marker by detecting the marker from the image of the background including the marker that is transmitted from the head mounted display device, and providing the pointer to the searched position, wherein the head mounted display device displays the pointer provided by the mobile communication terminal.

In still another aspect of the present invention, there is provided a method of using a mobile communication terminal as a pointer, which includes receiving an image of a background including a marker from a head mounted display device, searching for the position of the marker by detecting the marker from the received image, and displaying the pointer on the position of the searched marker.

In another aspect of the present invention, there is provided a mobile communication device including a controller to output a marker of a specified form on a screen; a communicator to receive an image of a background that includes the marker from a head mounted display; and a position detector to search for the position of the marker by detecting the marker from the received image.

In another aspect of the present invention, there is provided a head mounted display device including an image input unit to receive an image of a background that includes a marker; a communicator to transmit the image of the background that includes the marker to a mobile communication device; and a display to display a pointer provided by the mobile communication device.

In another aspect of the present invention, there is provided a system for using a mobile communication device as a pointer, including a head mounted display device to receive an input of an image of a background that includes a marker, wherein the mobile communication device searches for a position of the marker by detecting the marker from the image of the background including the marker that is transmitted from the head mounted display device, and providing the pointer to the searched position, and wherein the head mounted display device displays the pointer provided by the mobile communication device.

In another aspect of the present invention, there is provided a method of using a mobile communication device as a pointer, including receiving an image of a background including a marker from a head mounted display device; searching for a position of the marker by detecting the marker from the received image; and displaying the pointer on the position of the searched marker.

According to another aspect of the present invention, there is provided at least one computer readable medium storing computer readable instructions to implement methods of the present invention.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1A:
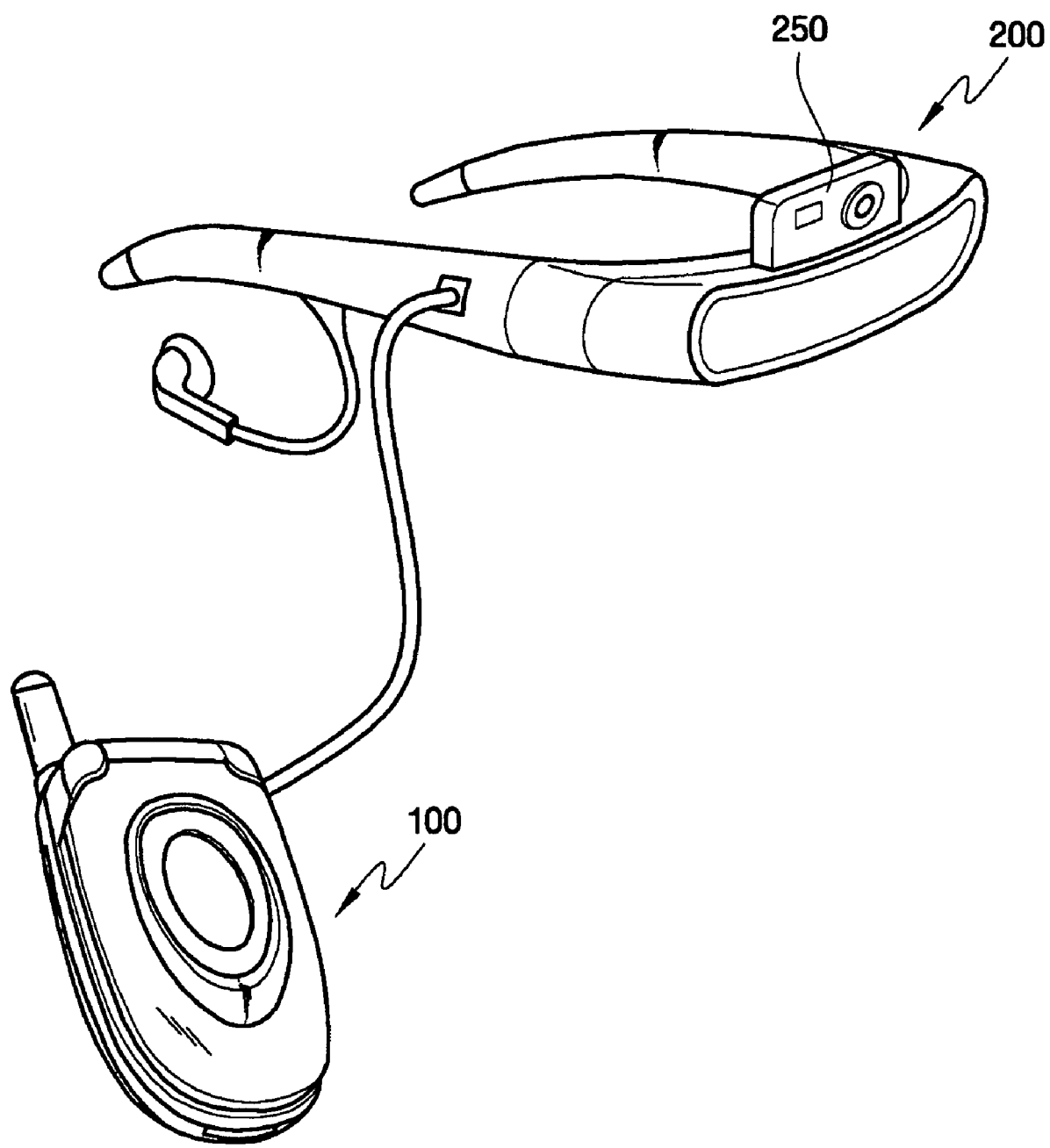
FIGS. 1a and 1b are views illustrating a system for using a mobile communication terminal (device) as a pointer according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1B:
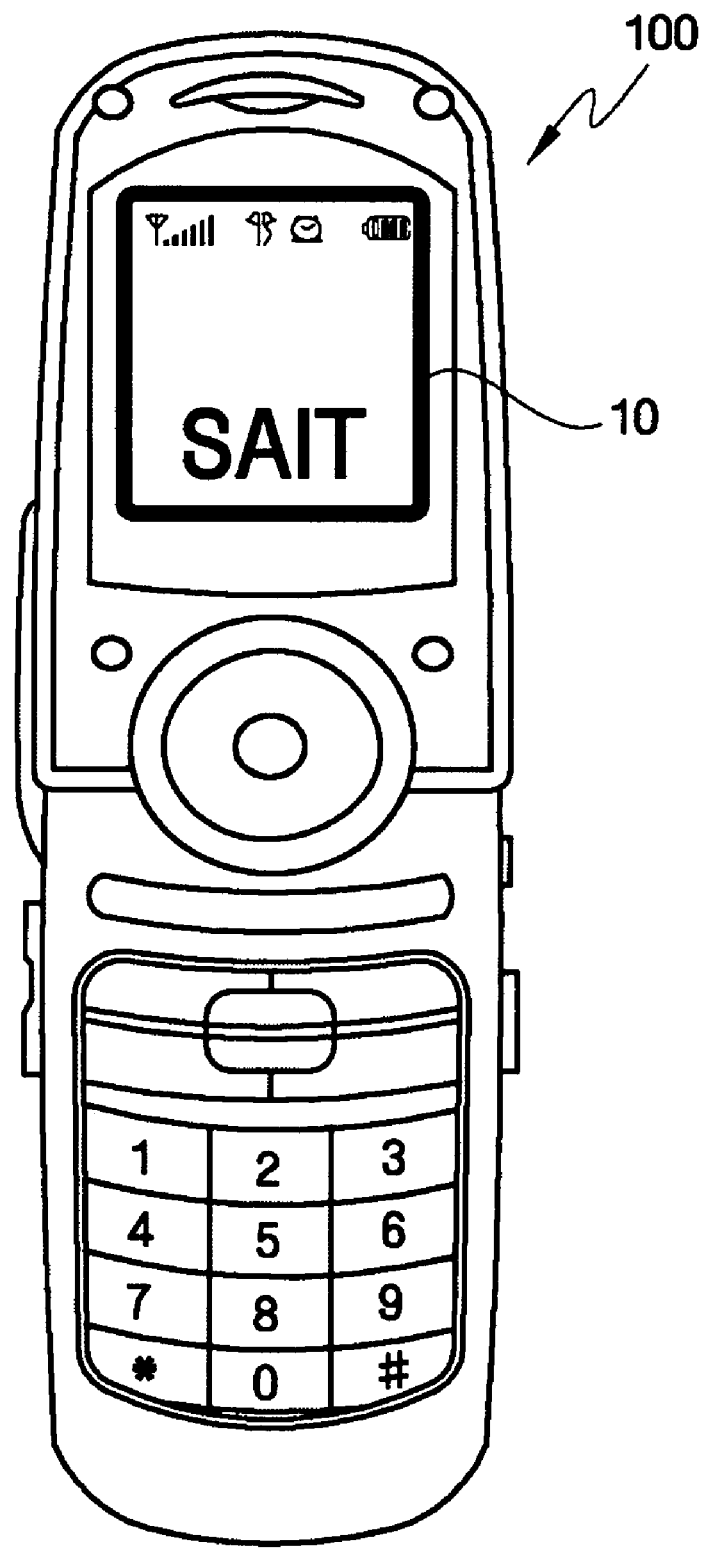

FIGS. 1a and 1b are views illustrating a system for using a mobile communication terminal as a pointer according to an exemplary embodiment of the present invention.

As illustrated in FIG. 1a, the system for enabling a mobile communication terminal (device) to be used as a pointer includes a mobile communication terminal (device) 100 and a head mounted display (HMD) 200.

The mobile communication terminal 100 is recognized as a pointer that can control an image displayed on a screen of the HMD 200 when the HMD 200 is operated. The mobile communication terminal 100, which is carried by a person, enables the person to make a voice call and a video telephony with the other person and to access the Internet, and may include a portable phone, a wireless application protocol (WAP), a personal digital assistance (PDA), an International Mobile Telecommunications 2000 (IMT2000), a wireless broadband (WiBro), and a world interoperability for microwave access (WiMAX).

In addition, the mobile communication terminal 100 may be set to a general mode or a pointer mode. Here, the general mode is a mode for performing a phone call that is an inherent function of the mobile communication terminal 100 and a schedule management, and the pointer mode is a mode for recognizing the mobile communication terminal as the pointer that can control the image displayed through the HMD 200.

For example, when the mobile communication terminal 100 is in a pointer mode, it is possible to select an object displayed on a screen provided through the HMD 200, or to input a key word through consonants and vowels of Hangul (or English) arranged on the mobile communication terminal 100. Here, the mobile communication terminal 100 is movable in X, Y, and Z directions. The construction and operation of the mobile communication terminal 100 will be explained later with reference to FIG. 2.

The HMD 200 is a kind of visual output device that a user wears on the head in a virtual reality (VR) system. The HMD 200 shows an image that is displayed on a display device such as an LCD or a CRT to the user using a precise optical mechanism. An image screen of the HMD 200 is located quite close to the user's eyes, the HMD 200 requires very precise optical devices to match the very short focal distance and to prevent eye strain. The HMD 200 may be considered as a portable large-screen display device through which the user can view the image with a feeling as if a large screen was several meters ahead of the user by the operation of the optical system.

In addition, the HMD 200 is provided with an image input device 250, and receives an input of a background image that includes the mobile communication terminal 100 through the image input device 250. Here, the image input device 250 may be provided separately from the HMD 200 or inside the HMD 200 in a body. The image input device 250 may be a camera.

In addition, the HMD 200 can control the information displayed on the screen (e.g., selection of a specified object provided on the screen and input of a key word) using the mobile communication terminal as the pointer. The detailed explanation of the HMD 200 will be made later with reference to FIG. 3.

As illustrated in FIG. 1b, a marker 10 is outputted on an LCD screen of the mobile communication terminal 100. Here, the marker (e.g., "SAIT") 10 is displayed on the screen of the mobile communication terminal 100, and the pointer is provided on the screen of the HMD 200 on the basis of the position of the marker 10. The marker may be outputted in diverse forms.

Figure 2:
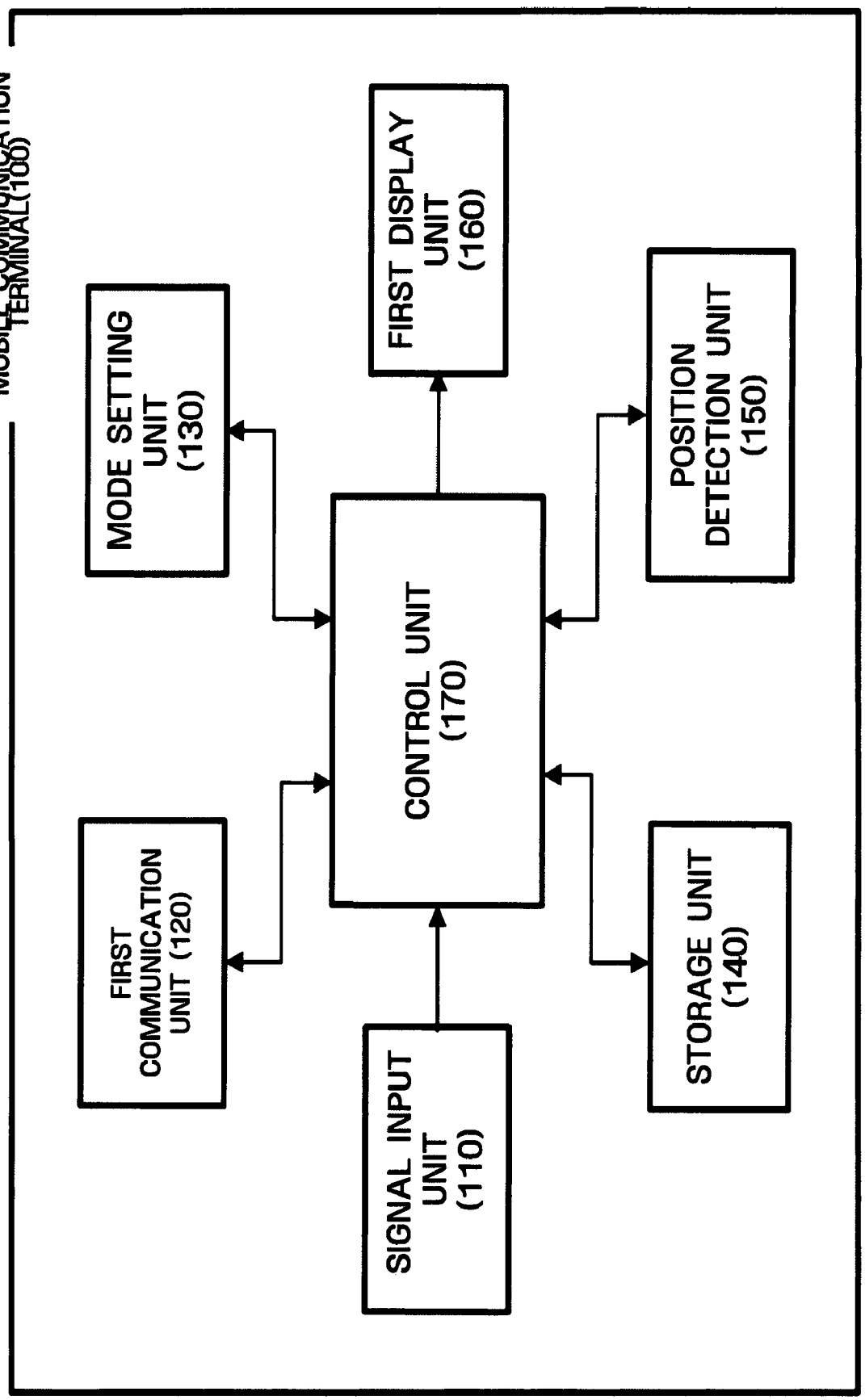
FIG. 2 is a block diagram illustrating the internal construction of a mobile communication terminal in a system for using the mobile communication terminal as a pointer according to another exemplary embodiment of the present invention.

FIG. 2 is a block diagram illustrating the internal construction of a mobile communication terminal 100 in a system for using the mobile communication terminal 100 as a pointer according to another exemplary embodiment of the present invention.

As illustrated in FIG. 2, the mobile communication terminal (device) 100 includes a signal input unit 110, a first communication unit (first communicator) 120, a mode setting unit (mode setter) 130, a storage unit 140, a position detection unit (position detector) 150, a first display unit (first display) 160, and a control unit (controller) 170.

The signal input unit 110 receives an input of a button signal generated by a user's button manipulation. Here, the input button signal may be classified into a mode setting signal, an object selection signal, a menu selection (e.g., Internet access, multi-tasking setting, and text message input) signal, and a text input signal.

The first communication unit 120 receives an image inputted through the HMD 200, and transmits a specified image to the HMD 200.

For example, the first communication unit 120 receives the environmental image (e.g., the background image including the marker 10) inputted through the HMD 200, and provides the image to the control unit 170. Also, the first communication unit 120 transmits images (e.g., DMB broadcasts, movies, Internet scenes and games) provided from the mobile communication terminal 100 to the HMD 200.

The mode setting unit 130 sets a mode of the mobile communication terminal 100. Here, the mode may be classified into a general mode and a pointer mode.

For example, the general mode is a mode for performing a phone call that is an inherent function of the mobile communication terminal 100 and a schedule management, and the pointer mode is a mode for selecting an object displayed on the screen provided through the HMD 200 and inputting a key word.

The storage unit 140 stores operation commands according to the modes of the mobile communication terminal 100 set through the mode setting unit 120. Also, the storage unit 140 stores background images including the marker transmitted through the communication unit 120.

When the mode of the mobile communication terminal 100 is set to the pointer mode, the position detection unit 150 searches for the position of the marker 10 by detecting the marker 10 from the background image received through the first communication unit 120. A process of detecting the position of the marker 10 outputted on the screen of the mobile communication terminal 100 will be explained later with reference to FIG. 5.

The first display unit 160 displays the marker 10 if the mode of the mobile communication terminal 100 is set to the pointer mode, while it displays a phone number, an address, and schedule information if the mode is set to the general mode.

If a signal generated by a user is inputted through the signal input unit 110, the control unit 170 analyzes the input signal, and controls the corresponding operation to be performed.

For example, the control unit 170 judges whether the input signal is a mode setting signal, a specified object selection signal, or a signal requesting a specified menu function (e.g., text input, Internet access, and multi-tasking function).

Also, the control unit 170 outputs the marker 10 for the position detection of the mobile communication terminal 100 on the screen if the mode of the mobile communication terminal 100 is the pointer mode. In this case, if the position detection unit 150 cannot find the marker 10, the control unit 170 adjusts the brightness of a back light of the mobile communication terminal 100 so that the position detection unit 150 can find the marker 10.

Also, the control unit 170 provides the pointer to the position of the marker found by the position detection unit 150. Accordingly, the pointer is displayed on the screen of the HMD 200.

Also, the control unit 170 generates vibration of the mobile communication terminal 100 if information is three-dimensionally arranged on the HMD 200 and the control unit can control the information through the pointer.

For example, if plural web browser scenes (e.g., first and second web browser scenes) are three-dimensionally displayed, the user does not accurately know whether the pointer is located on the first web browser or the second web browser. If the pointer is positioned on the corresponding web browser, the control unit generates vibration of the mobile communication terminal 100.

Also, the control unit 170 controls operations of the respective functional blocks 110 to 160 that constitute the mobile communication terminal.

Figure 3:
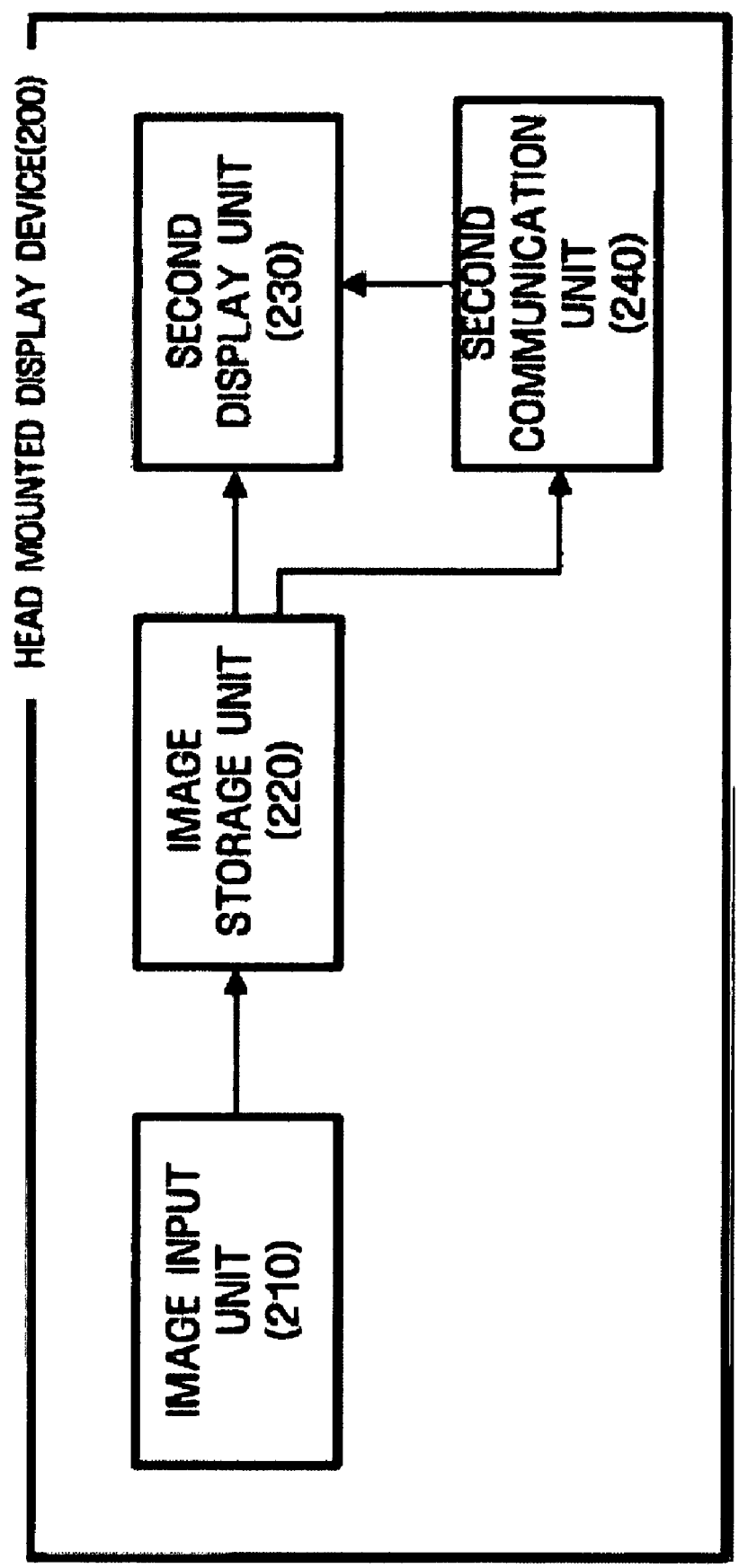
FIG. 3 is a block diagram illustrating the internal construction of a head mounted display (HMD) device in a system for using the mobile communication terminal as a pointer according to still another exemplary embodiment of the present invention.

FIG. 3 is a block diagram illustrating the internal construction of a head mounted display (HMD) device 200 in a system for using the mobile communication terminal as a pointer according to still another exemplary embodiment of the present invention.

Referring to FIG. 3, the HMD 200 includes an image input unit 210, an image storage unit 220, a second display unit (second display) 230, and a second communication unit (second communicator) 240.

The image input unit 210 receives the background image including the marker if the user puts on the HMD 200. Here, the image input unit 210 receives the image transmitted from the image input device 250.

For example, the image input unit 210 receives an input of the background image including the marker being outputted on the mobile communication terminal 100 through the image input device 250 (e.g., a camera).

The image storage unit 220 stores the image inputted through the image input unit 210.

The second display unit 230 displays the background image including the marker inputted through the image input unit 210 and specified images (e.g., DMB broadcasts, movies, Internet scenes and games) provided from the mobile communication terminal 100. Here, the second display unit 230 can be understood as a display, such as a near eye display (NED), which magnifies the images provided as small-size images to the size of 20 to 105 inches and displays the magnified images.

Also, the second display unit 230 displays the pointer provided by the mobile communication terminal 100.

The second communication unit 240 transmits the stored background image including the marker to the mobile communication terminal 100. Also, the second communication unit 240 transmits the specified images (e.g., DMB broadcasts, movies, Internet scenes and games) provided from the mobile communication terminal 100 to the second display unit 230.

Figure 4:
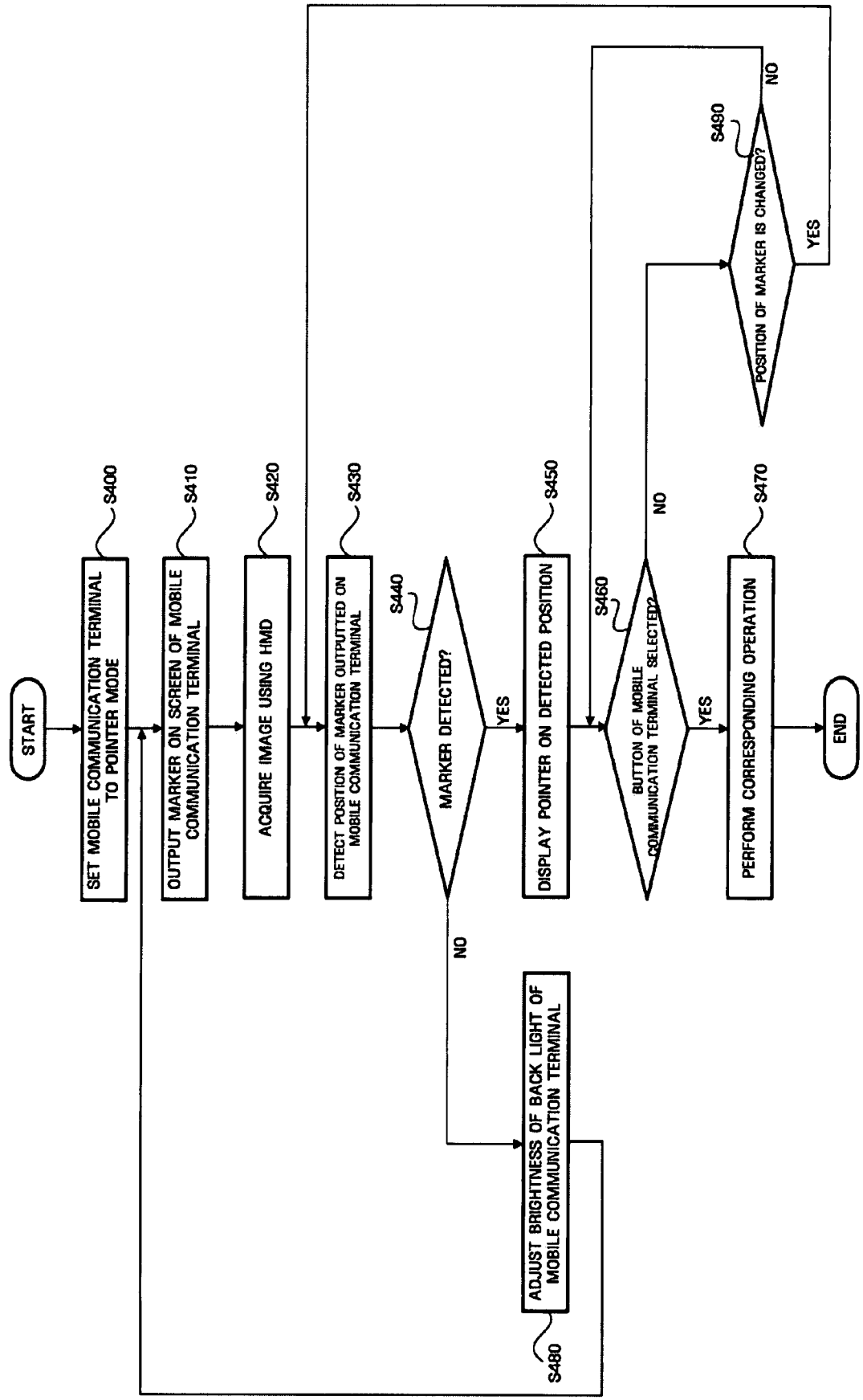
FIG. 4 is a flowchart illustrating a method of using a mobile communication terminal as a pointer according to still another exemplary embodiment of the present invention.

FIG. 4 is a flowchart illustrating a method of using a mobile communication terminal as a pointer according to still another exemplary embodiment of the present invention.

First, if the user sets the mode of the mobile communication terminal 100 to the pointer mode S400 using mode setting unit 130, the control unit 170 outputs the marker for the position detection of the mobile communication terminal 100 on the screen of the mobile communication terminal 100 S410.

Then, the HMD 200 acquires the stored background image including the marker 10 S420 through the image input unit 210, and stores the acquired background image including the marker 10 in the image storage unit 220.

Then, the HMD displays the stored background image including the marker 10 on the screen of the HMD 200 through the second display unit 230, and transmits the stored background image including the marker 10 to the mobile communication terminal 100 through the second communication unit 240.

The first communication unit 120 of the mobile communication terminal 100 receives the background image including the marker 10 from the HMD 200, and the position detection unit 150 searches for the position of the marker 10 by detecting the marker 10 from the transmitted image S430. The process of detecting the position of the marker 10 outputted on the screen of the mobile communication terminal 10 will be explained later with reference to FIG. 5.

Then, the control unit 170 checks whether the marker 10 has been detected through the position detection unit 150 S440, and if the marker 10 has been detected as a result of checking, it displays the pointer on the position of the screen of the HMD 200 where the marker 10 has been detected through the second display unit 230 of the HMD 200 S450. Here, on the screen of the HMD 200, specified images (e.g., DMB broadcasts, movies, Internet scenes and games) provided from the mobile communication terminal 100 can be displayed together with the pointer.

For example, the HMD 200 receives a specified web browser scene from the mobile communication terminal 100, and displays the web browser scene on the screen of the HMD 200. Then, the HMD 200 detects the position of the marker 10 by detecting the marker 10 outputted on the screen of the mobile communication terminal 100, and displays the pointer on the detected position. Accordingly, the pointer is displayed on the specified position of the web browser scene.

Then, if the user selects a button of the mobile communication terminal 100 S460, the signal input unit 110 receives a button signal generated according to the user's selection of the button, and the control unit 170 controls the corresponding operation to be performed according to the inputted button signal S470.

For example, the user can put the pointer on a specified object desired to be selected, which is provided on a web browser scene, by moving the position of the mobile communication terminal 100, and then select the corresponding object by selecting a button of the mobile communication terminal 100. Also, after putting the pointer in a search window, the user may input a specified key word to the search window of the web browser by using a button allocated with Hangul/English of the mobile communication terminal 100.

On the other hand, if the marker 10 is not detected as a result of checking S440, the control unit 170 adjusts the brightness of a back light of the mobile communication terminal 100 so that the position detection unit 150 can find the marker 10 more easily S480. Here, the control unit 170 adjusts the brightness of the back light for a predetermined number of times until the position detection unit 150 can detect the marker 10.

On the other hand, if the button of the mobile communication terminal 100 is not selected S460, the control unit 170 checks whether the button of the mobile communication terminal 100 is selected and whether the position of the marker 10 is changed at predetermined intervals S490. If the position change of the marker 10 outputted on the mobile communication terminal 100 is detected, the control unit 170 performs the process of step S430, while if the button selection of the mobile communication terminal 100 is detected, the control unit 170 performs the process of step S470.

Figure 5:
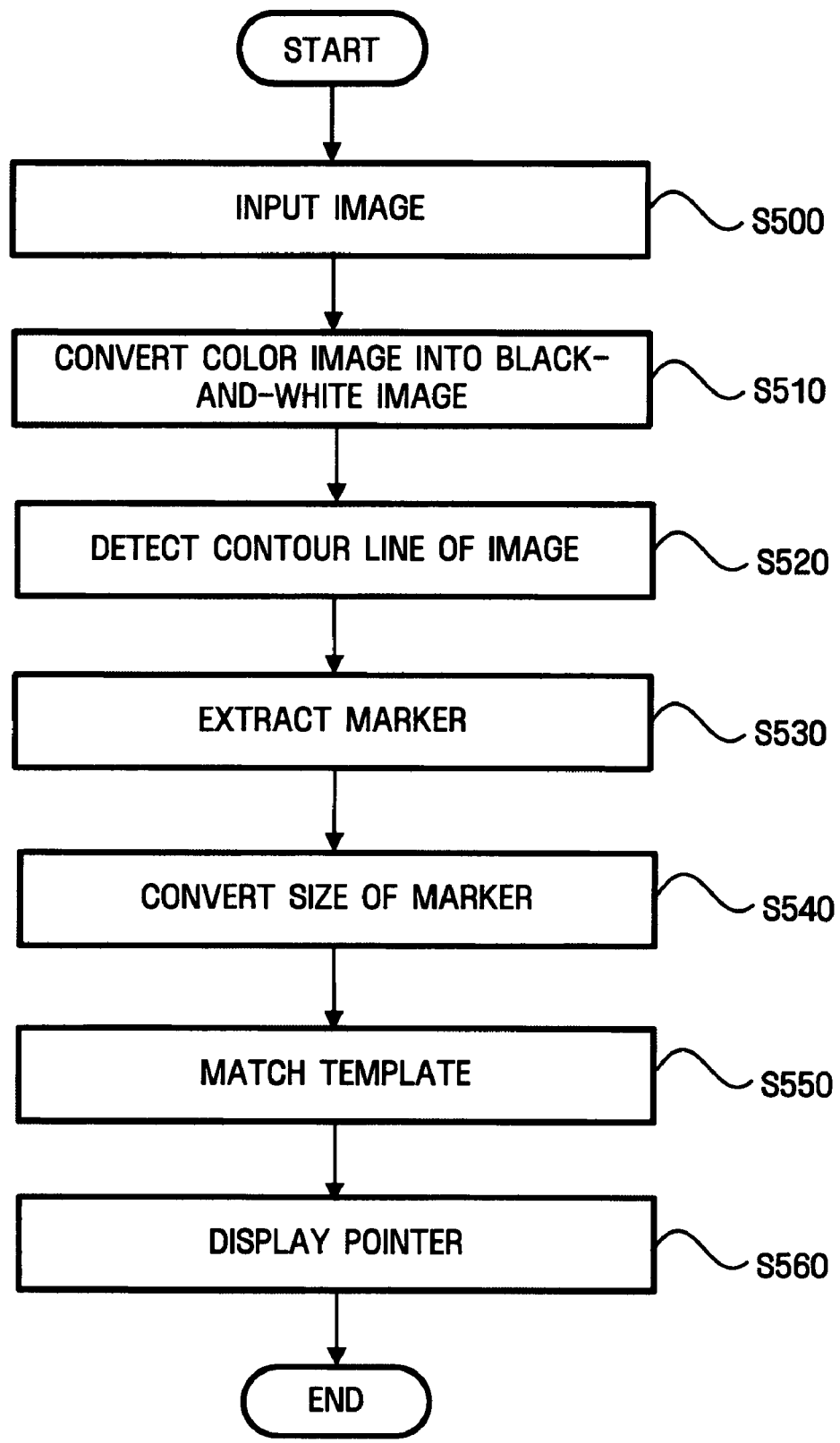
FIG. 5 is a flowchart illustrating a process of detecting the position of a marker outputted on a screen of a mobile communication terminal in a system for using the mobile communication terminal as a pointer according to still another exemplary embodiment of the present invention.

FIG. 5 is a flowchart illustrating a process of detecting the position of a marker outputted on a screen of a mobile communication terminal 100 in a system for using the mobile communication terminal 100 as a pointer according to still another exemplary embodiment of the present invention.

If the background image including the marker 10 is inputted from the image input unit 210 S500, the position detection unit 150 converts the input image into a black-and-white image S510. Here, the reason why the position detection unit converts the input image into the black-and-white image is to detect the contour line of the image more accurately by removing a chrominance component and a brightness component in the case in which the input image is a color image.

Then, the control unit detects the contour line of the input image S520. Canny edge detection may be used as the method of detecting the contour line of the image. The Canny edge detection performs equalization using a two-dimensional (2D) Gaussian filter in order to remove the noise of the image. This equalization can be expressed by Equation (1).

$$G*I \qquad (1)$$

Here, G denotes a Gaussian filter, and I denotes an input image.

Then, a normal vector $\bar{n}$ of the edge of each pixel is detected by Equation (2).

$$\bar{n} = \frac{\nabla(G*I)}{|\nabla(G*I)|} \qquad (2)$$

Then, zero-crossing points are detected on the basis of the normal vectors, and the detected zero-crossing points are selected as edges. The detection of the zero-crossing points is performed by Equation (3).

$$\frac{\partial^2(G*I)}{\partial \bar{n}^2} = 0 \qquad (3)$$

Thereafter, the marker 10 is extracted from the image expressed by the contour line S530. Here, Hough transform may be used as the method of extracting the marker. This Hough transform defines a cumulative function that increases according to the number of straight lines passing though an intersection on a Hough plane, and finds the straight line by finding the intersection that satisfies the condition of "the cumulative function>a boundary value".

If the marker 10 is extracted, the control unit normalizes the size of the marker 10 to a specified size S540, and performs a template matching to search for the same marker as the normalized marker 10 S550. Here, the template matching is to search for the same marker as the currently detected marker 10 in a DB where diverse forms of markers are stored.

Then, the position of the detected marker 10 becomes the position of the pointer, and the specified form of the pointer is displayed on the screen of the HMD 200 S560.

Thereafter, the position detection unit 150 detects the position of the marker 10 at predetermined intervals, and this is because the position of the mobile communication terminal may be moved by the user. In this case, the method of detecting the movement of the marker 10 and the moved position of the marker 10 can detect the moved position of the marker 10, i.e., the position of the mobile communication terminal 100, by detecting the position of the marker 10 through the image input device 250, and estimating the relative positions of the marker 10 and the camera by comparing the characteristic of the detected marker 10 with the characteristic of the marker 10 previously known.

Figure 6:
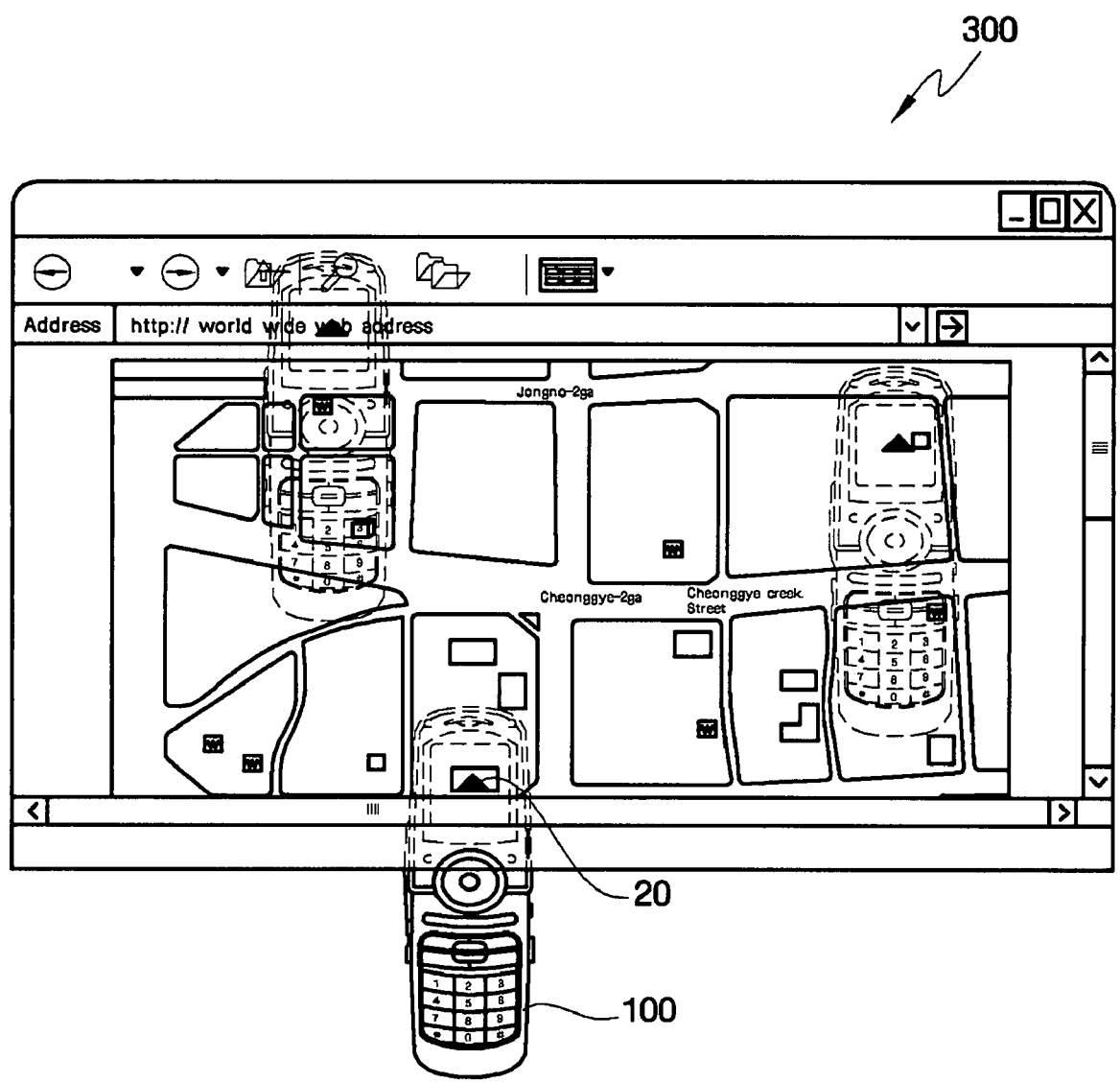
FIG. 6 is a view illustrating an example of using a web browser provided through an HMD in a method of using a mobile communication terminal as a pointer according to still another exemplary embodiment of the present invention.

FIG. 6 is a view illustrating an example of using a web browser provided through an HMD in a method of using a mobile communication terminal as a pointer according to still another exemplary embodiment of the present invention.

As illustrated in FIG. 6, the user may execute a web browser 300 using the mobile communication terminal 100 and set the present mode to the pointer mode, or the mobile communication terminal 100 may automatically set the pointer mode along with the execution of the web browser 300.

Then, the marker 10 is outputted on the screen of the mobile communication terminal 100, and the image input device (e.g., camera) of the HMD 200 is driven to input the background image including the marker 10.

In this case, the mobile communication terminal 100 searches for the position of the marker 10 by detecting the marker, and displays the pointer 20 on the screen of the HMD 200 corresponding to the searched position.

Thereafter, the user can view the web browser scene 300 on the screen of the HMD 200, and the pointer 20 is displayed on the web browser scene.

Accordingly, the user can move the position of the pointer 20 displayed on the web browser scene 300 by moving the mobile communication terminal 100, and select specified objects using the pointer 20.

In addition, if the user puts the pointer 20 in the search window of the web browser scene 300, the pointer 20 is displayed as a text input cursor, and thus the user can obtain desired information by inputting the key words. Here, the user can input the specified key word through the button allocated with Hangul/English of the mobile communication terminal 100.

Figure 7:
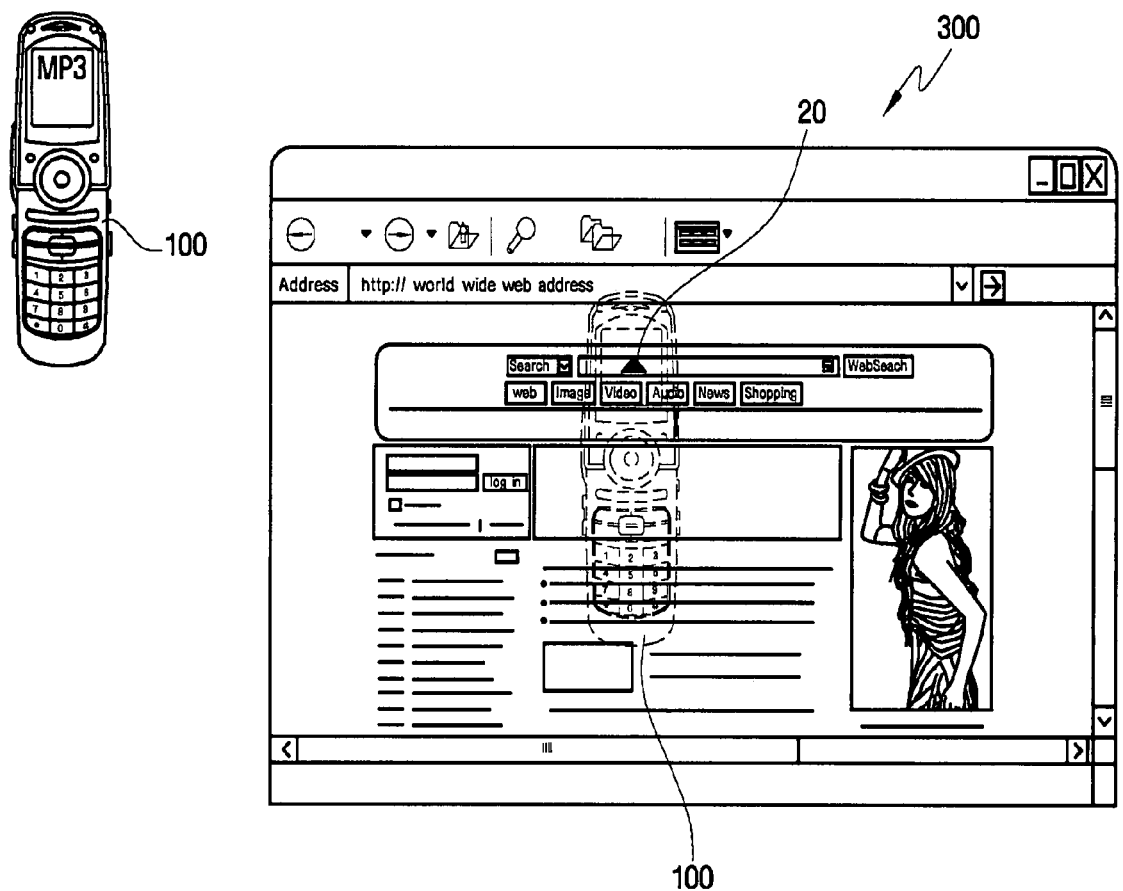
FIG. 7 is a view illustrating an example of performing a multi-tasking work through a mobile communication terminal and an HMD in a method of using the mobile communication terminal as a pointer according to still another exemplary embodiment of the present invention.

FIG. 7 is a view illustrating an example of performing a multi-tasking work through a mobile communication terminal and an HMD in a method of using the mobile communication terminal as a pointer according to still another exemplary embodiment of the present invention.

As illustrated in FIG. 7, the user may listen to music by executing an MP3 music file using the mobile communication terminal 100.

When the user desires to search for information on the music that the user is listening to (e.g., words information and album information), he/she selects a multi-tasking function through the mobile communication terminal 100. Here, the multi-tasking function denotes a simultaneous execution of two or more works at a time. For instance, the user can play a game or use another menu as he/she is listening to an MP3 music. A separate button for selecting the multi-tasking function may be provided in the mobile communication terminal 100, or a specified button provided in the mobile communication terminal 100 may be used as the button having the function of selecting the multi-tasking in the event that the mode of the mobile communication terminal 100 is set to the pointer mode.

The control unit 170 can recognize that the user has requested the multi-tasking function by checking the button selected by the user, and in this case, the function of the mobile communication terminal 100 is changed to the multi-tasking function. Then, the position detection unit 150 searches for the position of the marker 10 by detecting the marker 10 outputted on the screen of the mobile communication terminal 100.

Then, the web browser scene 300 is displayed on the screen of the HMD 200, and the pointer 20 is displayed on the position corresponding to the searched marker 10.

After moving the position of the pointer 20 in the search window, the user inputs a key word desired to be searched. Accordingly, the user can search for the desired information through the web browser 300 as he/she is listening to the MP3 music.

Figure 8:
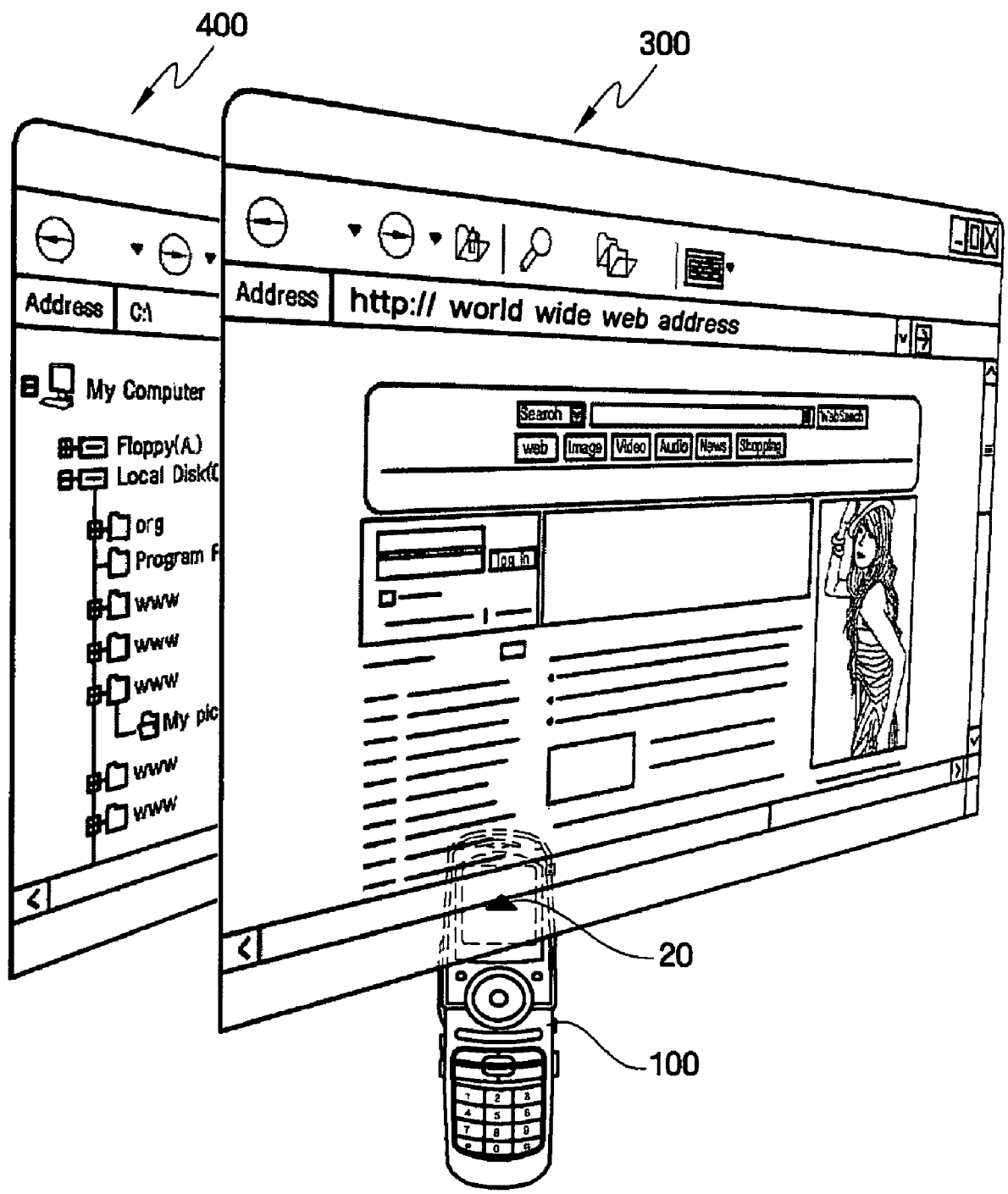
FIG. 8 is a view illustrating an example of using a web page three-dimensionally arranged on an HMD screen in a method of using a mobile communication terminal as a pointer according to still another exemplary embodiment of the present invention.

FIG. 8 is a view illustrating an example of using a web page three-dimensionally arranged on an HMD screen in a method of using a mobile communication terminal as a pointer according to still another exemplary embodiment of the present invention.

As illustrated in FIG. 8, the user executes the web browser 300 using the mobile communication terminal 100 after setting the mode of the mobile communication terminal 100 to the pointer mode.

Then, the marker 10 is outputted on the screen of the mobile communication terminal 100, and the image input device (e.g., camera) of the HMD 200 is driven, so that the background image including the marker 10 is inputted.

The mobile communication terminal 100 searches for the position of the marker 10 by detecting the marker 10, and displays the pointer 20 on the screen of the HMD 200 corresponding to the searched position.

Then, the user can view the web browser scenes 300 and 400 on the screen of the HMD 200, and the pointer 20 displayed on the web browser scene 300. Here, a plurality of web browser scenes 300 and 400 may be three-dimensionally arranged, and the user can move the pointer 20 in a specified direction (i.e., X, Y, or Z direction) in the three dimensional space by moving the mobile communication terminal 100.

In this case, since the user cannot accurately know on which web browser scene the pointer 20 is positioned, the position detection unit informs the user of the position of the pointer by generating vibration of the mobile communication terminal 100.

For example, it is assumed that the pointer 20 exists on the first web browser scene 300 shown in front on the screen and the user selects a specified object on the second web browser scene 400 shown behind the first web browser scene 300.

In this case, since the user cannot accurately judge whether the pointer 20 is located on the first web browser scene 300 or the second web browser scene 400, he/she moves and puts the mobile communication terminal 100 on the object to be selected. If the pointer 20 exists on the corresponding web browser, the mobile communication terminal 100 generates vibration, so that the user can accurately recognize the current position of the pointer 20 in a direction of the depth of the pointer.

As described above, the system for using a mobile communication terminal as a pointer and the method thereof according to the present invention have one or more of the following advantages.

Information displayed on an HMD screen can be controlled using a mobile communication terminal as a pointer.

The position detection of the mobile communication terminal is possible by outputting a marker on the mobile communication terminal, without employing any separate motion detection sensor.

Information three-dimensionally arranged on the HMD screen can be controlled using the mobile communication terminal as the pointer.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), and hardware storage devices (e.g., read only memory media, random access memory media, flash memories, etc.). The medium/media may also be a distributed network, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, or a combination of a software component and a hardware component, which performs certain tasks. A module may advantageously be configured to reside on the addressable storage medium/media and configured to execute on one or more processors. Thus, a module may include, by way of example, components, such as software components, application specific software component, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s).

In exemplary embodiments of the present invention, the term "unit", as used herein, denotes, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented so as to execute one or more CPUs in a device.

The computer readable code/instructions and computer readable medium/media may be those specially designed and constructed for the purposes of the present invention, or they may be of the kind well-known and available to those skilled in the art of computer hardware and/or computer software.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A mobile communication device comprising:
   a controller to output a marker of a specified form on a screen;
   a communicator to receive an image of a background that includes the marker from a head mounted display; and
   a position detector to detect the position of the marker by detecting the marker from the received image.

2. The mobile communication device of claim 1, further comprising:
   a signal input unit to receive a button signal generated by a user's button manipulation;
   a mode setter to set an operation mode requested by the user; and
   a display to display the marker on the screen in accordance with a marker output request from the controller.

3. The device of claim 2, wherein the operation mode is a general mode or a pointer mode.

4. The device of claim 1, wherein the position of the marker detected by the position detector corresponds to movement of the mobile communication device.

5. The device of claim 1, wherein the communicator transmits a second image to the head mounted display, wherein the second image is from one of a broadcast signal, a movie, a web browser scene and a game.

6. A head mounted display device comprising:
   an image input unit to receive an image of a background that includes a marker;
   a communicator to transmit the image of the background that includes the marker to a mobile communication device; and
   a display to display a pointer provided by the mobile communication device.

7. The head mounted display device of claim 3, wherein the marker is outputted in a specified form on the screen of the mobile communication device.

8. The head mounted display of claim 6, wherein movement of the mobile communication device positions the pointer on the display.

9. The head mounted display of claim 6, wherein the image input unit is a camera.

10. A system for using a mobile communication device as a pointer, comprising:
   a head mounted display device to receive an input of an image of a background that includes a marker,
   wherein the mobile communication device searches for a position of the marker by detecting the marker from the image of the background including the marker that is transmitted from the head mounted display device, and providing the pointer to the searched position, and
   wherein the head mounted display device displays the pointer provided by the mobile communication device.

11. The system of claim 10, wherein the marker is outputted in a specified form on a screen of the mobile communication device.

12. The system of claim 10, wherein the head mounted display device includes a screen, and movement of the mobile communication device positions the pointer on the screen.

13. The system of claim 10, wherein the head mounted display device receives the input of the image via a camera.

14. The system of claim 10, wherein the mobile communication device transmits a second image to the head mounted display, wherein the second image is from one of a broadcast signal, a movie, a web browser scene and a game.

15. A method of using a mobile communication device as a pointer, comprising:
   receiving an image of a background including a marker from a head mounted display device;
   searching for a position of the marker by detecting the marker from the received image; and
   displaying the pointer on the position of the searched marker.

16. The method of claim 15, further comprising displaying the marker in a specified form on a screen of the mobile communication device if a mode of the mobile communication device is set to a pointer mode.

17. The method of claim 15, further comprising updating changed position of the marker by detecting position of the marker at predetermined intervals.

18. The method of claim 15, further comprising inputting a phone number and making a phone call if a mode of the mobile communication device is set to a general mode.

19. The method of claim 15, wherein the background further comprises a web browser.

20. At least one non-transitory computer readable medium storing computer readable instructions that control at least one processor to implement the method of claim 15.

21. The method of claim 15, further comprising moving the displayed pointer by moving the mobile communication device.

22. The method of claim 15, further comprising transmitting a second image to the head mounted display device, wherein the second image is from one of a broadcast signal, a movie, a web browser scene and a game.

23. The method of claim 15, further comprising:
   selecting specified information provided at a point where the pointer is positioned by selecting a button of the mobile communication device.

24. The method of claim 23, wherein the mobile communication device moves in any one of X, Y, and Z directions.

25. The method of claim 24, wherein the mobile communication device generates a vibration to accurately recognize position of pointer when the mobile communication terminal moves in the Z-direction.

26. A method of displaying a pointer on a head mounted display device, the method comprising:
   receiving an image of a background including a marker displayed on a mobile communication device;
   detecting a position of the marker displayed on the mobile communication device; and
   displaying a pointer on a screen of the head mounted display device, wherein the displaying of the pointer is based on the detected position of the marker.

* * * * *

UNITED STATES PATENT AND TRADEMARK OFFICE
CERTIFICATE OF CORRECTION

PATENT NO. : 8,135,440 B2
APPLICATION NO. : 11/709224
DATED : March 13, 2012
INVENTOR(S) : Young-jin Hong et al.

It is certified that error appears in the above-identified patent and that said Letters Patent is hereby corrected as shown below:

Column 13, Line 1, In Claim 7, delete "claim 3," and insert -- claim 6, --, therefor.

Column 13, Line 4, In Claim 8, delete "display of" and insert -- display device of --, therefor.

Column 13, Line 7, In Claim 9, delete "display of" and insert -- display device of --, therefor.

Signed and Sealed this
Twenty-fourth Day of July, 2012

David J. Kappos
*Director of the United States Patent and Trademark Office*